United States Patent [19]
Breda et al.

[11] Patent Number: 6,091,335
[45] Date of Patent: Jul. 18, 2000

[54] OPTICAL DEVICE FOR THE DETECTION OF ICING CONDITIONS ON AIRCRAFT

[75] Inventors: Jean-Marc Breda, Vendome; Joël Choisnet, Naveil; Monique Naim, Vendome, all of France

[73] Assignee: Sextant Avionique, Velizy Villacoublay, France

[21] Appl. No.: 09/146,539

[22] Filed: Sep. 3, 1998

[30] Foreign Application Priority Data

Sep. 9, 1997 [FR] France .................................. 97 11161

[51] Int. Cl.⁷ .................................................. G08B 19/02
[52] U.S. Cl. ........................... 340/580; 340/581; 340/583; 340/584; 340/600; 340/602; 250/573; 250/574; 244/134 F
[58] Field of Search ..................................... 340/580, 581, 340/583, 584, 588, 589, 600, 604, 602, 905; 250/573, 574, 578.1, 575; 244/134 F; 73/170.26, 170.17; 342/26, 22, 460; 356/381, 382, 338

[56] References Cited

U.S. PATENT DOCUMENTS

| | | | |
|---|---|---|---|
| 2,656,525 | 10/1953 | Kinsella | 340/581 |
| 4,251,733 | 2/1981 | Hirleman, Jr. | 250/575 |
| 4,613,938 | 9/1986 | Hansen et al. | 702/3 |
| 4,797,603 | 1/1989 | Choisnet | 324/678 |
| 4,797,660 | 1/1989 | Rein, Jr. | 340/583 |
| 4,972,725 | 11/1990 | Choisnet | 73/862.337 |
| 5,010,775 | 4/1991 | Choisnet | 73/862.337 |
| 5,028,929 | 7/1991 | Sand et al. | 342/26 |
| 5,229,844 | 7/1993 | Breda | 356/358 |
| 5,354,015 | 10/1994 | Meador | 244/134 F |
| 5,406,839 | 4/1995 | Leblond et al. | 73/180 |
| 5,484,121 | 1/1996 | Padawer et al. | 244/134 F |
| 5,488,375 | 1/1996 | Michie | 342/26 |
| 5,596,320 | 1/1997 | Barnes | 340/962 |
| 5,641,972 | 6/1997 | Breda | 250/573 |
| 5,748,091 | 5/1998 | Kim | 340/583 |
| 5,801,647 | 9/1998 | Survo et al. | 340/905 |

FOREIGN PATENT DOCUMENTS

| | | |
|---|---|---|
| 0 405 625 A2 | 1/1991 | European Pat. Off. . |
| 2 158 939 | 11/1985 | United Kingdom . |
| WO 94/09463 | 4/1994 | WIPO . |
| WO 96/28345 | 9/1996 | WIPO . |

OTHER PUBLICATIONS

J. F. Gayet, et al., "Industrial Measurement Of Microphysical Parameters—Application To Natural And Simulated Icing Clouds", L'Onde Electrique, 72(1992)Jan./Feb., No. 1, pp. 21–25.

"Optical Detection Of Ice On A Helicopter Rotor", NTIS Tech Notes, Aug. 1992, pp. 616.

Primary Examiner—Benjamin C. Lee
Attorney, Agent, or Firm—Oblon, Spivak, McClelland, Maier & Neustadt, P.C.

[57] ABSTRACT

An optical device on board an aircraft for detecting icing conditions including an optical beam emitter to create at least one illuminated external volume of measurement through which there circulates a flow of air charged with water particles; a collector optical system for the collection of at least a part of the light beam back-scattered by the water particles (the external volume of measurement being located on the optical axis of said collector optical system); a photodetector for detecting back-scattered optical beams; a signal processor for processing the signal delivered by the photodetector to compute the severity of the icing conditions; an information provider for providing information on the calculated severity of the icing conditions. Advantageously, the optical means for the differentiation of device includes a differentiation for differentiating between liquid water particles and solid water particles, based on analysis of the polarization.

8 Claims, 5 Drawing Sheets

OPTICAL DEVICE FOR THE DETECTION OF ICING CONDITIONS ON AIRCRAFT

BACKGROUND OF THE INVENTION

1. Field of the Invention

The present invention is directed to detecting for aircraft. The problem of rapidly forming ice is presently still a serious problem capable of causing accidents when it occurs suddenly and when it has not been possible to detect it earlier.

2. Description of the Prior Art

At present, aircraft are equipped with temperature probes and their speed is known, but the severity of the icing conditions is not determined.

The current measurement systems detect the appearance of ice but do not determine the icing conditions. In particular, the aircraft may be equipped with bar type protuberances. When the bar gets iced up, a luminous indicator informs the aircraft pilot that it is time to activate the de-icing equipment. Electrical power is then sent to the bar to de-ice it.

Other similar predictive devices exist. These devices constantly heating the bar. The electrical power needed for heating increases when water particles come into contact with the bar. The tracking of the change in the amount of electrical power that has to be used provides an indication of the icing conditions.

Nevertheless, in the prior art devices, it is necessary to use a protuberance in addition to the existing temperature probes, which may be at odds with improved aerodynamic features of the aircraft.

SUMMARY OF THE INVENTION

The present invention provides an optical device for detecting icing conditions that works through an optical window of the aircraft or even through the temperature probe.

More specifically, an object of the invention is an optical device for detecting icing conditions where the device is placed on board an aircraft. The device includes:

emission means to emit an optical beam to create at least one illuminated external volume of measurement through which there circulates a flow of air charged with water particles;

a collector optical system for collecting at least a part of the light beam back-scattered by the water particles (the external volume of measurement being located on the optical axis of said collector optical system);

photodetection means for the photodetection of back-scattered optical beams;

a device for processing the signal delivered by the photodetection means to compute the severity of the icing conditions; and means for providing information on icing conditions on the basis of the severity of the icing conditions.

Advantageously, the emission means may comprise a compact, light-weight source (e.g., a laser diode light source) because the device of the invention does not require the use of high-powered optical systems, rather, a few mWatts are sufficient. It is thus possible to make the probe work without causing any ocular risk to an individual who places his or her eye in the emitted optical beam.

According to an alternative embodiment of the invention, it is possible to carry out a very fine analysis of the icing conditions by differentiating between liquid water particles in a supercooled state (at a temperature below zero) and solid water particles. Indeed, the liquid water particles represent an increased danger, inasmuch as they freeze instantaneously on the aircraft when they collide with it. This analysis relies on the fact that drops of supercooled water preserve linear polarization while ice crystals depolarize light.

To implement this analysis, the optical device according to the invention may comprise a polarization separator in the collector optical system in order to isolate the back-scattered optical beams that have different types of polarization from one another, the emission means having delivered a polarized optical beam upline. These two back-scattered optical beams may be detected simultaneously by two photodetectors or else they may be detected by a single photodetector, after having been separated in time.

The optical device may also comprise, at the emission means, a birefringent element capable of generating two optical beams with different types of polarization in slightly different directions and thus two offset illuminated volumes of measurement and hence two back-scattered optical beams that are also offset.

According to one embodiment of the invention, the optical device can be integrated into the aircraft and may work through an optical window.

According to another embodiment of the invention, the optical device may be integrated into the temperature probe. A configuration of this kind comprises:

an optical fiber for emission that connects the emission means integrated into the aircraft up to the external end of the temperature probe; and an optical fiber for reception connecting the external end of the temperature probe up to the signal reception and processing means integrated into the aircraft.

BRIEF DESCRIPTION OF THE DRAWINGS

The invention will be understood more clearly and other advantages shall appear in the following description given on a purely non-restrictive basis with reference to the appended drawings, in which.

DETAILED DESCRIPTION OF THE PREFERRED EMBODIMENT

Figure 1:
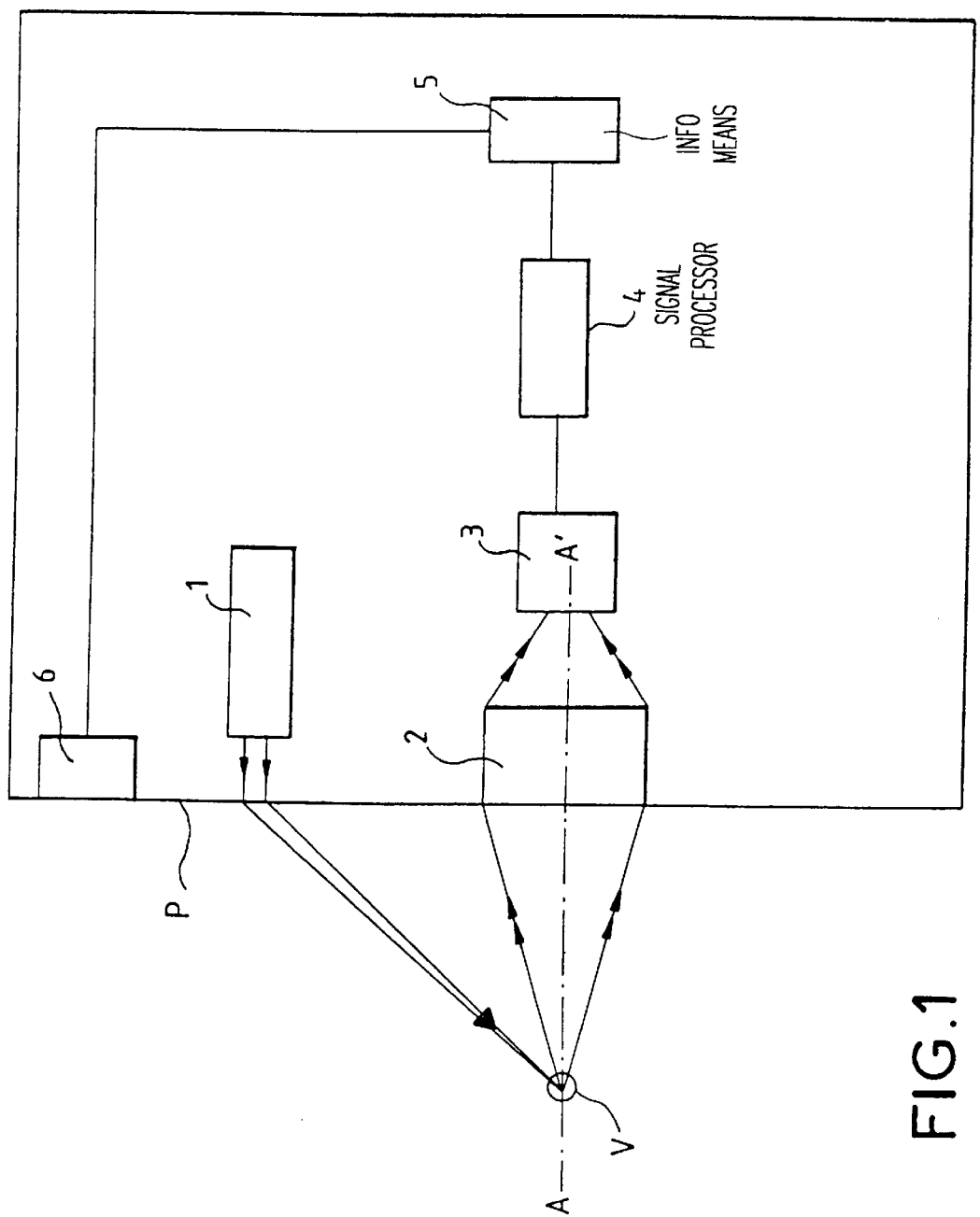
FIG. 1 illustrates a drawing of the optical device for the detection of icing conditions.

The optical device for the detection of icing conditions essentially includes, in its basic configuration, the elements illustrated in FIG. 1, including:

emission means 1 for emitting an optical beam directed towards the outside of the aircraft, through the skin of the aircraft P, so as to create an illuminated volume of measurement V, crossed by a flow of air charged with water particles;

a collector optical system 2 for collecting of at least part of the optical beam back-scattered by the water particles;

photodetection means 3 for the photodetection of the back-scattered beam;

a device 4 for processing the signal delivered by the photodetection means 3 so as to determine the concentration of water particles in the air;

means 5 for providing information on the icing conditions on the basis of the data delivered by the device 4 and the temperature data delivered by a temperature probe 6.

Figure 2:
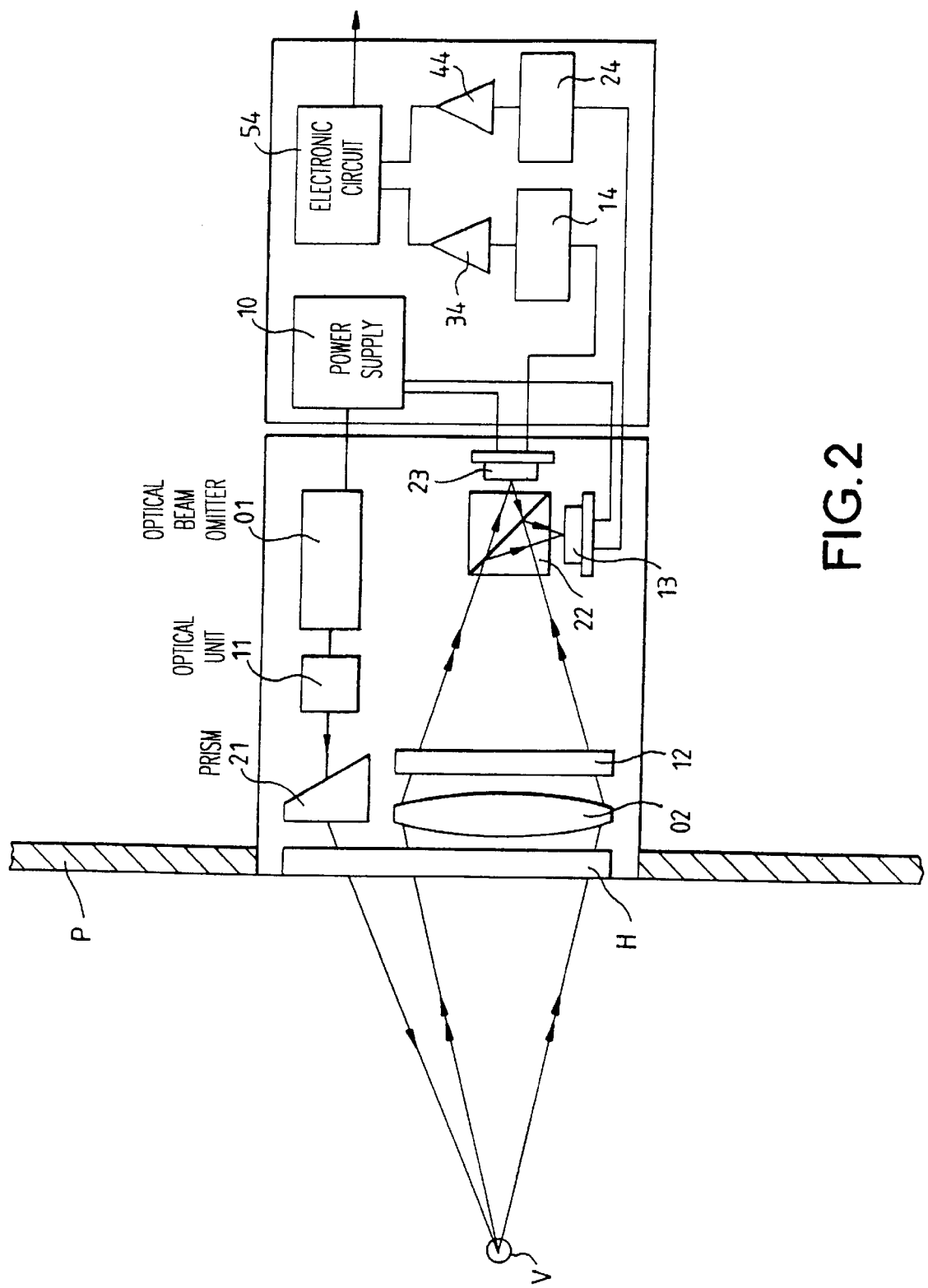
FIG. 2 illustrates a first exemplary optical device for detecting of icing conditions including two photodetectors and a differentiator for differentiating between the liquid water particles and the solid water particles using the two photodetectors.

According to a first exemplary optical device according to the invention, the collector optical system comprises means of differentiating between liquid water particles and solid water particles by analyzing the polarization of the light collected. An exemplary device of this kind is illustrated in FIG. 2.

The emission means may comprise a polarized laser diode 01 (e.g., emitting in the visible or near infra-red range (between 400 nm and 1500 nm)), a collimation optical unit 11 and a deflection prism 21, so as to create an illuminated volume of measurement V on the optical axis AA' of the collector optical system, through the porthole window H of the aircraft, located on the skin P of the aircraft.

Typically, the emission means can emit light outside the skin of the aircraft, at a distance of approximately 100 mm. This makes it possible to carry out measurements outside the boundary layer of the aircraft (the area in which measurements would not be representative) while preserving a reasonable level of emitted power, a volume of polarized light whose dimensions are smaller than one mm, namely a value below which it can be shown that the probability of having two particles simultaneously in the volume of measurement is almost zero.

The collector optical system may comprise a focusing optical unit 02 with a small diameter (10 to 20 mm) and a narrow-band optical filter module 12 (working typically in the range of about 10 nm) that enables the filtering of solar illumination. The collector optical system may also comprise a polarization separator 22, which may be either a polarizing separator cube or a birefringent separator.

In this alternative, the photodetection means comprise two photodetectors 13 and 23 which recover cross-polarized optical beams. The polarization of the optical beam back-scattered by the liquid water particles is identical to that of the incidental optical beam. A signal $I_{1L}$ relating to this back-scattered optical beam is recovered at a photodetector 13. On the other hand, the photodetector 23 recovers a real signal relating to a cross polarization ($I_{2L}=0$).

The polarization of the optical beam back-scattered by the solid water particles is modified in relation to that of the incidental optical beam. The two photodetectors 13 and 23 recover signals $I_{1S}$ and $I_{2S}$, when a particle passes into the volume of measurement.

The device according to the invention comprises the power supplies 10 needed for the emission means and the reception means.

The signal processing device comprises:

means 14 and 24 for filtering the signals received by the photodiodes 13 and 23;

variable gain electronic amplification means 34 and 44 for the amplification of the signals;

electronic circuitry 54 carrying out the mathematical processing of the received signals (summation, comparison of the two channels, computation of the severity of the icing conditions).

The main characteristics of the signal are:

its temporal width which depends on the speed of the particle and on the dimensions of volume of measurement (it duration is equal typically to 1 μs);

its amplitude which depends on the size of the particle;

its rate of polarization which depends on the shape and hence on the nature of the particle. Indeed, the drops of supercooled water which are spherical in shape preserve the polarization, whereas the ice crystals depolarize light.

The electronic system placed downline from the photodiodes fulfills the following functions:

the filtering means 14 and 24 make it possible in particular to decrease the noise;

the amplification means 34 and 44 may advantageously be variable gain amplification means so as to obtain signals proportional to the volume of the drops of water;

the electronic circuitry 54 computes the total volume of the drops of water that pass per unit of time, by summing the signals obtained on the two channels. It also computes the rate of polarization by computing the energy ratio between the signals of the two channels and thus determines the nature of the particles.

The electronic circuitry thus makes it possible to quantify the amount of liquid water that passes per unit of time and the nature this water.

This information together with the temperature information (from the temperature probe 6 of FIG. 1) thus makes it possible to determine the severity of the icing conditions.

In the exemplary device that has been just described, the emission means and the collector optical system comprise distinct focusing means. According to another alternative of the invention, it is possible to replace the prism 21 and the optical unit 02 by a single field lens placed against the porthole window and centered on the optical axis AA'.

According to a particularly worthwhile device of the invention, the emission and reception means are laid out in such a way that the incidental optical beam has a direction forming an angle known as a 'rainbow' angle of about forty degrees with the optical axis AA'. Indeed, it can be shown that, in this configuration, the drops of water will radiate an intense and strongly polarized radiation towards the receiver part. This radiation is characteristic of spherical water drops with an optical index of 1.33 (which is characteristic of water).

According to a second exemplary device for detecting icing conditions, the photodetection means can comprise a single photodetector, enabling the reduction of the filtering and amplification means downline. For this purpose, it is sufficient to carry out a temporal staggering of the information relating to a first given polarization and the information relating to a second polarization crossed with the first polarization.

Figure 3:
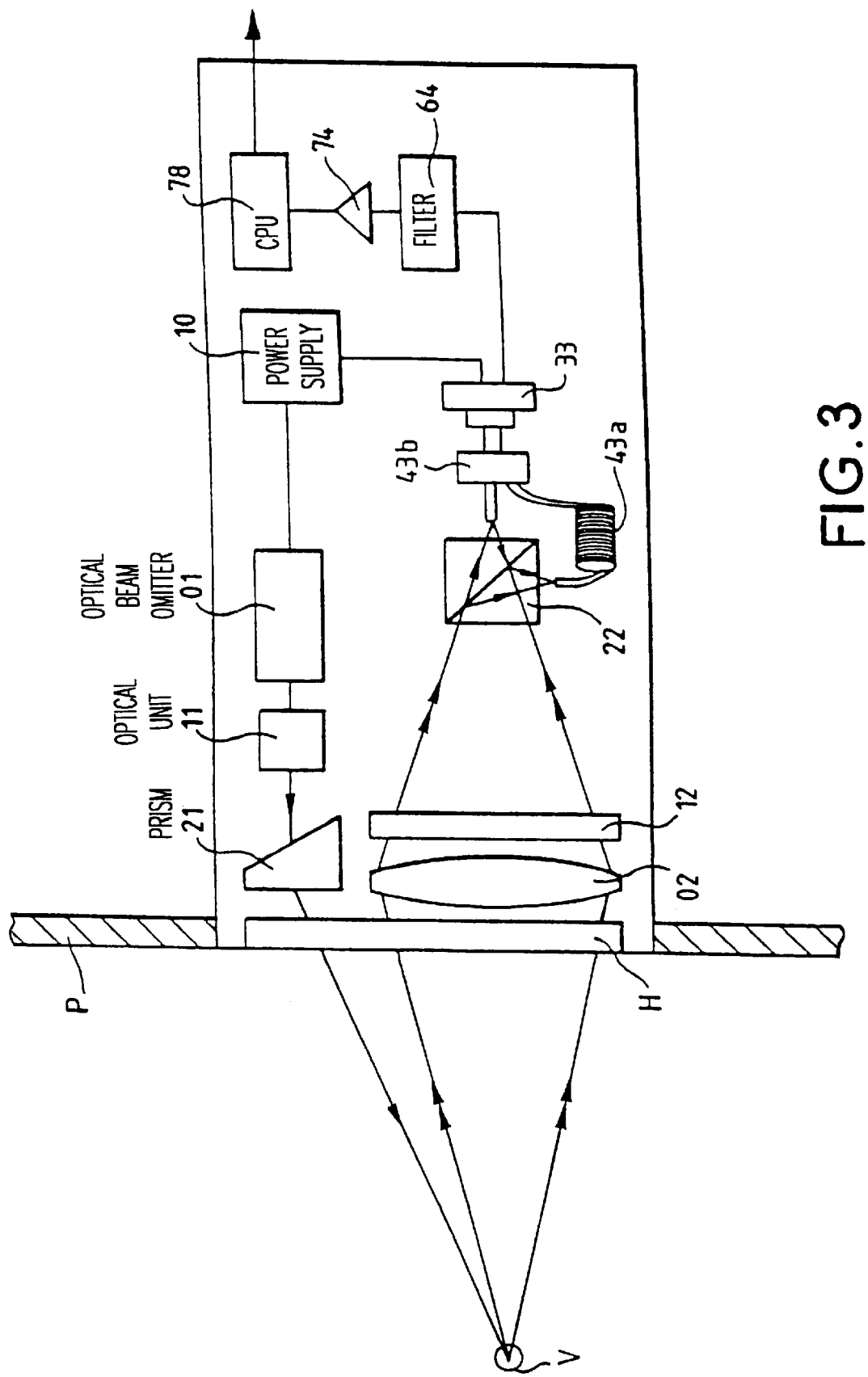
FIG. 3 illustrates a second exemplary optical device for detecting of icing conditions including a photodetector and a differentiator for differentiating between the liquid water particles and the solid water particles.

FIG. 3 illustrates an exemplary device according to the invention working with only one photodetector.

The emission means 21, 11, 01 may be identical to those described in the example of FIG. 2. This may also be the case with the collector optical system with its means 02 and 12 also as well as the element 22.

On the other hand, at the exit of one of the channels, it is possible to introduce a difference in optical path through a fiber 43a, and a coupler 43b enables a single photodetector 33 to collect all the temporally staggered signals. The length of optical fiber is calculated so as to make the signals succeed one another in an interval of time that is sufficiently short as compared with the frequency with which the water particles enter the volume of measurement.

At the exit of the photodetector 33, there is a single filter 64, a variable gain amplifier 74 and the computation processing unit 84.

Figure 4:
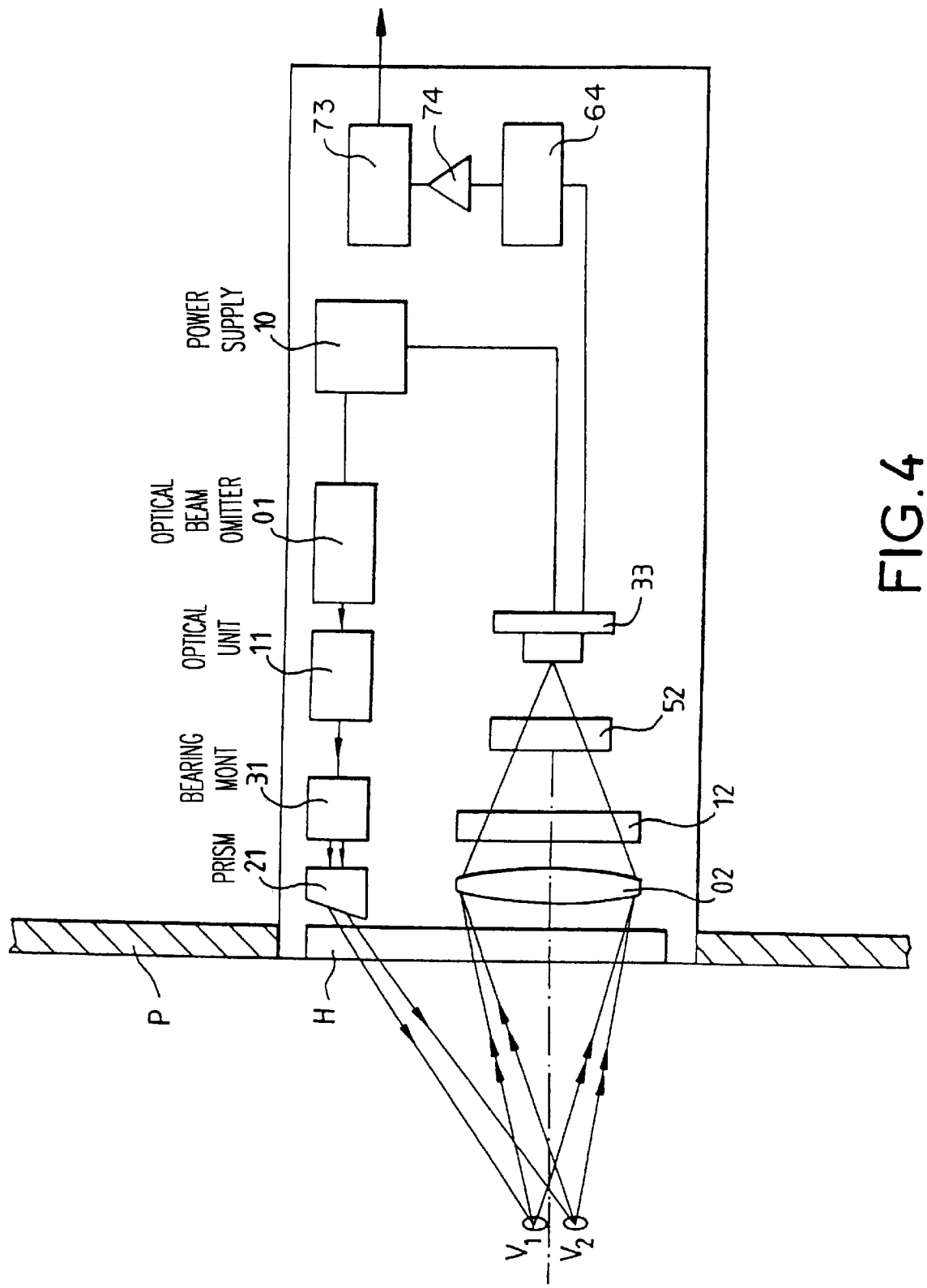
FIG. 4 illustrates a third exemplary optical device for the detection of icing conditions including (1) a birefringent element, (2) a polarizer, and (3) a differentiator for for differentiating between the liquid water particles and the solid water particles.

The temporal staggering of the signals relating to the two crossed polarizations can also be initiated at the emission means as illustrated in FIG. 4. For this purpose, a birefringent element 31 enables the creation, from a single polarized beam, of two linearly polarized optical beams with perpendicular polarizations $P_{//}$ and $P_\perp$.

The deflecting prism 21, directs the two incident beams with crossed polarization into two slightly offset volumes of measurement $V_1$ and $V_2$. After passing into the collector optical system and its elements 02 and 12, and then passing into a polarizer 52 with a polarization P parallel to $P_{//}$, the back-scattered optical beams are detected by the photodetector 33.

The back-scattered optical beams are made up:
for the beam with the initial polarization $P_{//}$, of a high component relating to the liquid water drops and a weak component relating to the solid water drops;
for the beam with the initial polarization $P_\perp$, of two neighboring components relating to the liquid and solid water drops.

In this exemplary device, the electronic circuitry downline from the photodetector may be of same type as that of the preceding example illustrated in FIG. 3.

In each of the above examples, a device has been described that is applied against the internal face of a porthole window of an aircraft. Generally the temperature probe is placed at another part of the porthole window and the two types of information (relating to the severity of the icing conditions) are coupled in a central processing unit so that the severity of the icing conditions can be deduced therefrom.

Figure 5:
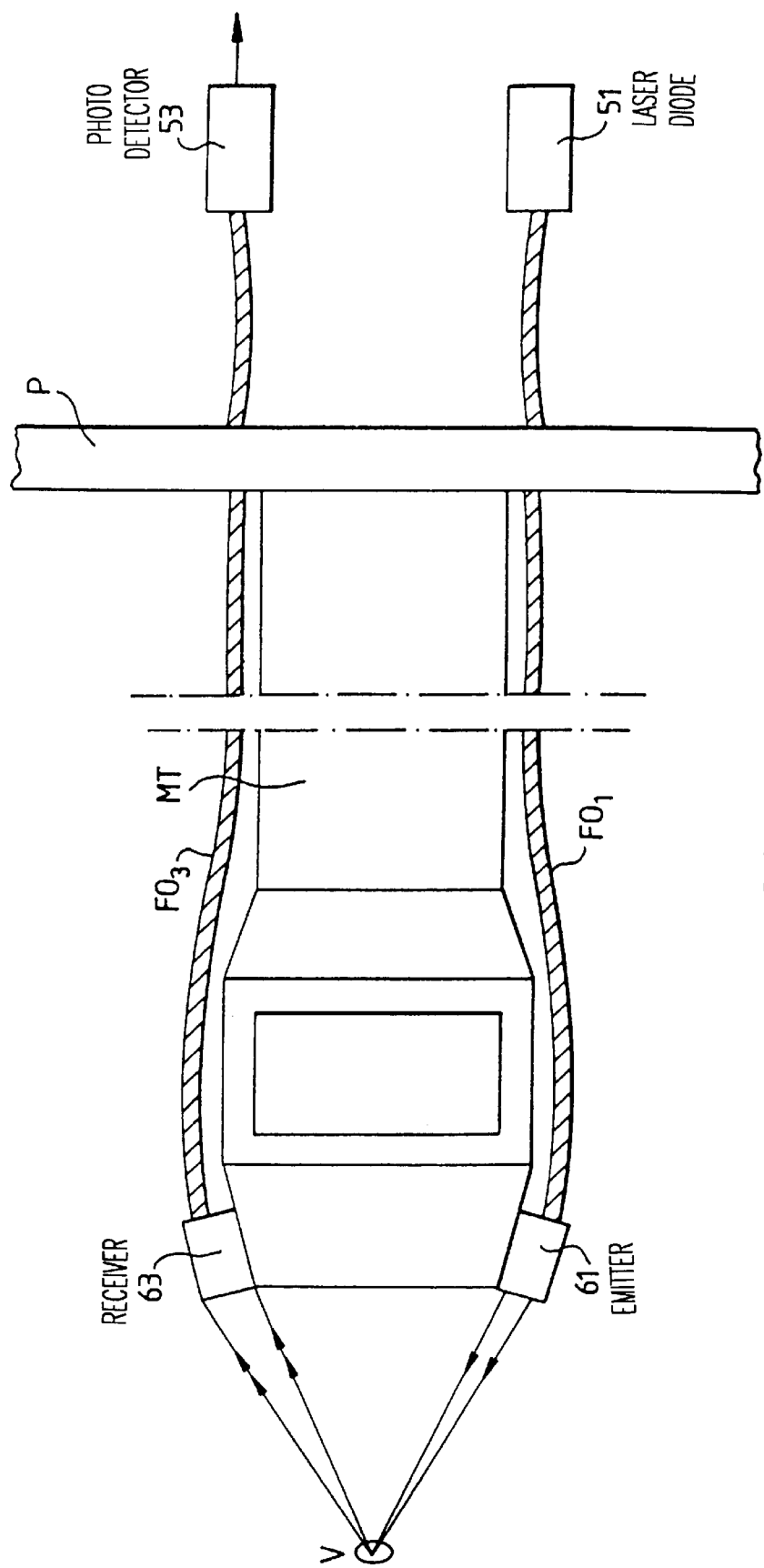
FIG. 5 illustrates a configuration in which the device of the invention is integrated into the temperature probe.

According to one alternative embodiment of the invention, the device for detecting icing conditions may be integrated directly into the temperature probe. FIG. 5 illustrates an example in which a emission laser diode 51 emits an optical beam through the skin of the aircraft. The optical beam is propagated through the optical fiber $F0_1$ which is coupled to an emitter optical system 61 to emit an optical beam towards the volume of measurement V.

The optical beam back-scattered by the water particles is collected at a receiver optical system 63 (typically a lens with an index gradient) and propagated through the optical fiber $F0_3$ that goes through the skin of the aircraft and is coupled to a photodetector 53.

The two optical fibers $F0_1$ and $F0_3$ are mounted along the mast of the temperature probe MT.

With an emitted energy level of about one mW, a sighting distance of about 10 mm is attained. This is a sighting distance smaller than that of devices installed behind a porthole window. By making use of the protuberance that constitutes the temperature probe, it is thus possible to use a smaller sighting distance with lower power values and optical systems that are also smaller while at the same time being outside the boundary layer of the aircraft.

It must be noted however that a device of this kind (given the optical constraints) is adapted rather to applications in which it is not necessary sought to obtain a very fine analysis of the icing conditions relying on a differentiation of behavior in polarization between supercooled water drops and ice crystals.

It may indeed be worthwhile to count only the water drops per unit of time to define a threshold beyond which the risks of icing become preponderant.

In all these devices, the information on the number of drops of water or the concentration of water in the air, coupled with the information on temperature, can be communicated to the aircraft pilot by a indicator that can pass from a green state to a red state in the least sophisticated devices, or by an indicator giving following information:

severity of icing conditions which is equal to the water concentration multiplied by the speed of the aircraft;

type of water particles; and risk of icing.

What is claimed is:

1. An optical device on board an aircraft and coupled to temperature and velocity sensors of the aircraft for detecting icing conditions, the device comprising:

an optical beam emitter for emitting an optical beam to create at least one illuminated volume of measurement external to the aircraft through which flows air charged with water particles;

a collector optical system for collecting a portion of light back-scattered by the water particles, wherein the volume of measurement is located on an optical axis of said collector optical system;

photodetection means for detecting a varying polarization of the back-scattered light collected by the collector optical system over time to distinguish between liquid water particles and ice particles;

a signal processor for processing a signal output by the photodetection means, a velocity received from the velocity sensors, and a temperature received from the temperature sensor to compute a severity of the icing conditions, wherein the severity of icing conditions is indicative of a water concentration multiplied by a speed of the aircraft; and means for providing information on the computed severity of the icing conditions, wherein the optical beam emitter is external to a back-scattering path of the back-scattered light.

2. The optical device according to claim 1, wherein the optical beam comprises a laser diode.

3. The optical device according to claim 2, wherein the laser diode is polarized and the collector optical system comprises a polarization separator, delivering two optical beams with different types of polarization.

4. The optical device according to claim 3, wherein the photodetection means comprise two photodetectors for collecting the two optical beams with different types of polarization.

5. An optical device for the detection of icing conditions according to claim 3, wherein collector optical system further comprises means to introduce a difference in optical path for the two optical beams with different types of polarization, the photodetection means comprising a photodetector to receive the two optical beams with different types of polarization that are temporally staggered due to the difference in optical path.

6. An optical device according to claim 2, further comprising a birefringent element, interposed between the laser diode and an exterior of the aircraft, for creating, from the optical beam delivered by the laser diode, two external volumes of measurement and two optical beams back-scattered by the water particles, wherein the photodetection means comprises a photodetector to receive two temporally staggered optical beams.

7. An optical device according to claim 1, further comprising:
- a first optical fiber for carrying the emitted optical beam within the first optical fiber up to an external end of the temperature probe externally mounted on the aircraft; and
- a second optical fiber mounted on the external end of the temperature probe for receiving the back-scatter light and applying the back-scattered light through the second optical fiber to the collector optical system.

8. An optical device according to claim 1, wherein optical axes of the optical beam emitter and the photodetection means mutually form a rainbow angle of about 40° to optimize an energy received by the photodetection means.

* * * * *